Figure 1:
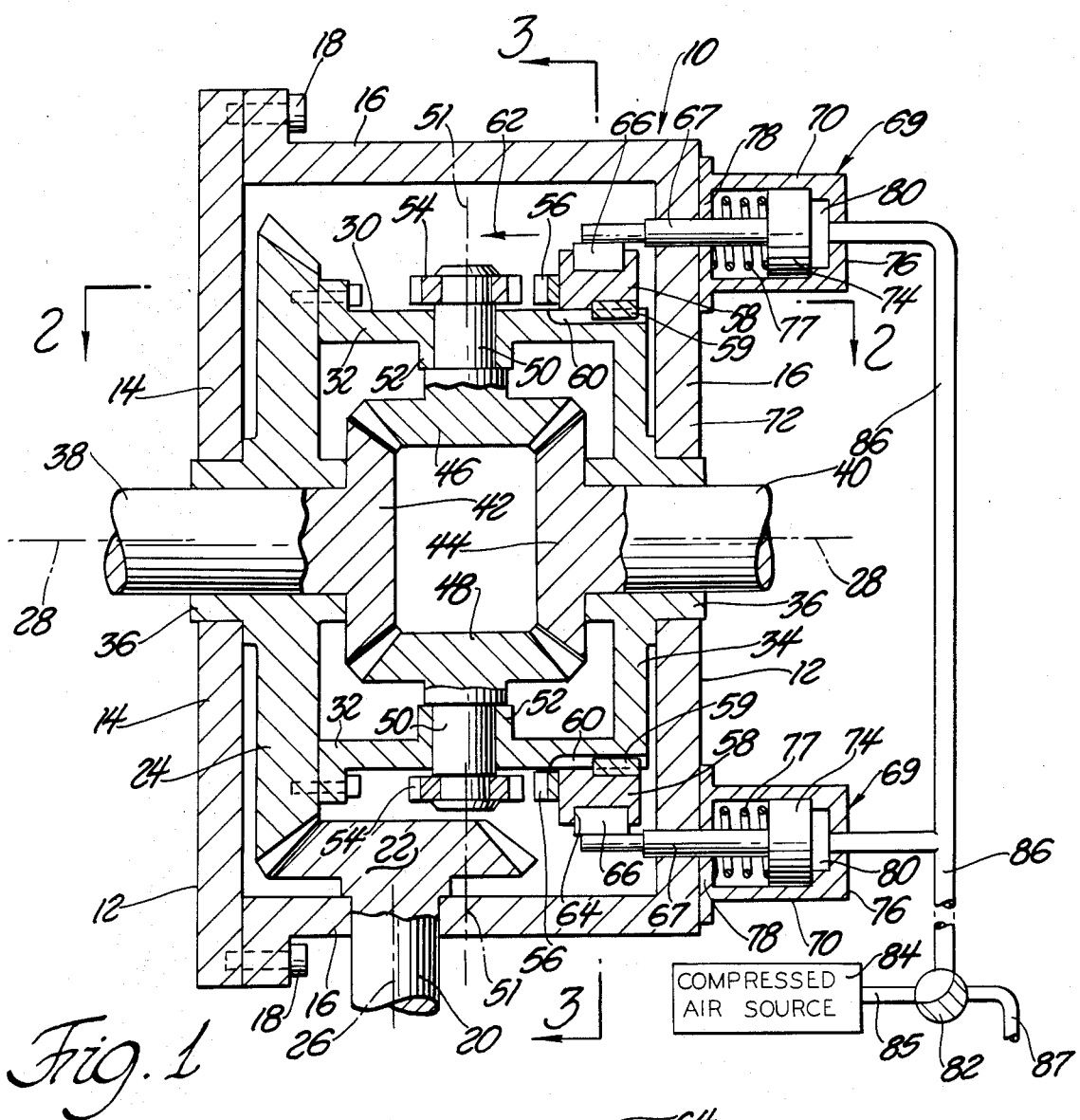

United States Patent [19]

Gant

[11] Patent Number: 4,715,248

[45] Date of Patent: Dec. 29, 1987

[54] MANUAL DIFFERENTIAL LOCK-UP

[76] Inventor: Lawrence A. Gant, 628 University Pl., Grosse Pointe City, Mich. 48230

[21] Appl. No.: 884,829

[22] Filed: Jul. 11, 1986

[51] Int. Cl.⁴ ............................................. F16H 1/44
[52] U.S. Cl. ..................................... 74/710.5; 74/711; 192/56 F
[58] Field of Search ............................. 74/710.5, 711; 192/56 F

[56] References Cited

U.S. PATENT DOCUMENTS

| | | | |
|---|---|---|---|
| 968,224 | 8/1910 | Wolf | 74/710.5 |
| 1,682,386 | 8/1928 | Lewis | 74/710.5 |
| 2,132,692 | 10/1938 | Lawrence | 74/710.5 |
| 2,175,684 | 10/1939 | Dickerson | 74/710.5 |
| 2,203,282 | 6/1940 | Keese | 74/710.5 X |
| 2,734,609 | 2/1956 | Fritzsch | 192/85 C X |
| 3,400,610 | 9/1968 | Taylor et al. | 74/710.5 |
| 3,429,410 | 2/1969 | Hansen | 192/85 CA |
| 3,448,635 | 6/1969 | Nelson | 74/710.5 |
| 3,498,154 | 3/1970 | Muller-Berner | 74/710.5 |
| 3,595,353 | 7/1971 | Beneke | 192/85 CA X |
| 3,788,166 | 1/1974 | Hart et al. | 74/710.5 |
| 3,805,933 | 4/1974 | Pray | 192/85 CA |
| 3,807,539 | 4/1974 | Reed | 192/56 F X |
| 3,973,450 | 8/1976 | Shealy | 74/710.5 |
| 3,974,717 | 8/1976 | Breed et al. | 74/710.5 X |
| 4,263,824 | 4/1981 | Mueller | 74/710.5 X |
| 4,526,063 | 7/1985 | Oster | 74/710.5 |
| 4,572,260 | 2/1986 | Ordu | 152/158 |
| 4,572,262 | 2/1986 | Entmayr et al. | 152/501 |

FOREIGN PATENT DOCUMENTS 3325485 11/1984 Fed. Rep. of Germany ..... 74/710.5

Primary Examiner—Leslie Braun
Assistant Examiner—Dwight G. Diehl
Attorney, Agent, or Firm—Peter A. Taucher; John E. McRae

[57] ABSTRACT

An improved mechanism for delivering motive power to the wheel-tire units on a land vehicle, comprising a differential having two operating modes, namely a "locked" mode and an "unlocked" mode. The unlocked mode is used when a tire is punctured; differences in tire diameter incident to tire puncture are effectively compensated. The locked mode is used when the vehicle is traversing slippery terrain; tractive force is maintained under adverse operating conditions.

1 Claim, 5 Drawing Figures

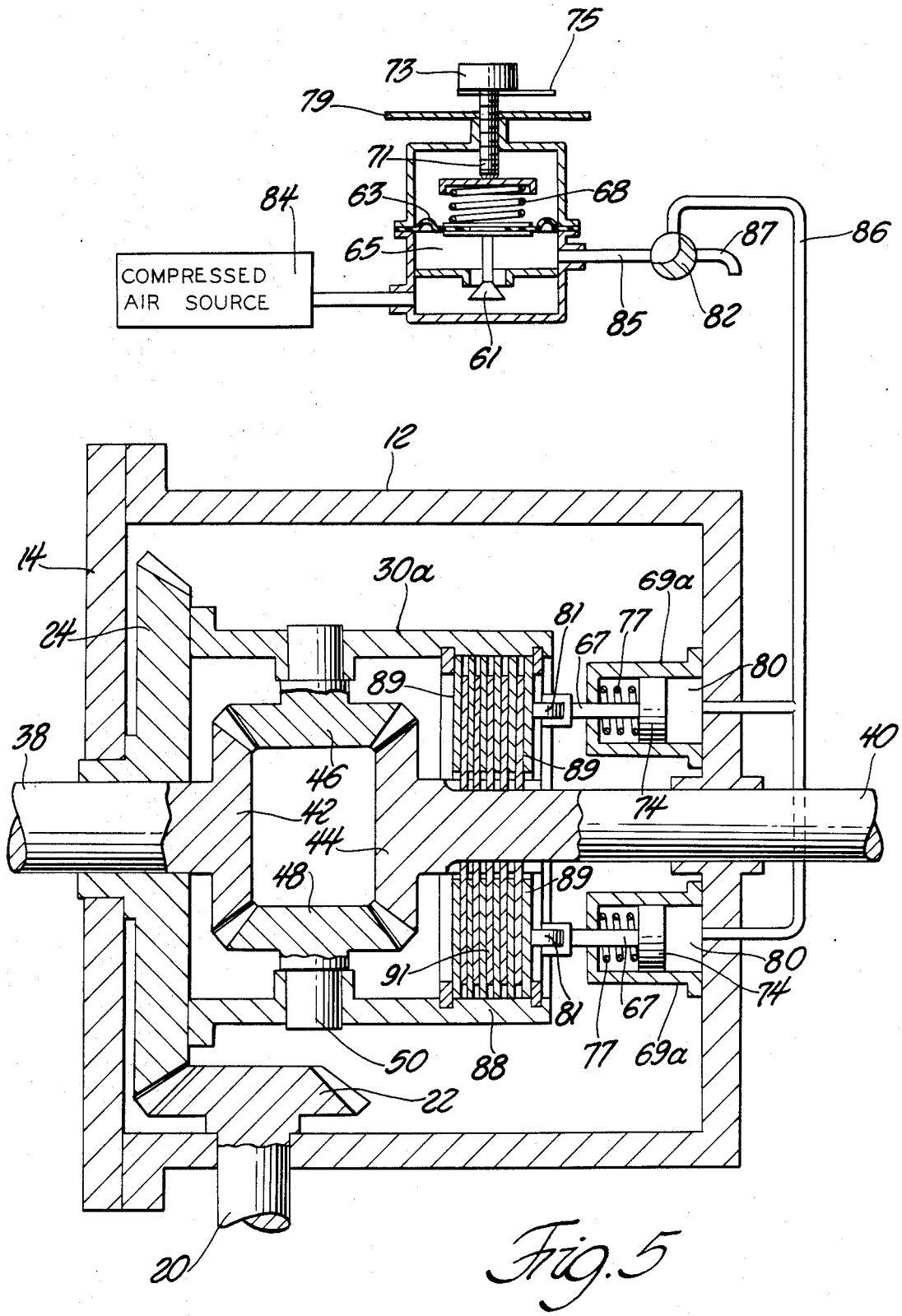

MANUAL DIFFERENTIAL LOCK-UP

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to drive systems for military vehicles, particularly wheeled vehicles using limited slip differentials and run-flat tires.

Military forces have sought to improve the mobility of wheeled vehicles by substituting limited slip differentials for conventional differentials. A differential is a gear system that distributes driving torque to both right and left wheel axles as it compensates for the different distances that the two powered road-wheels must travel when the associated vehicle is turning in one direction or another. For example, when the vehicle is turning to the left, the rightmost powered wheel must travel farther (faster) than the leftmost powered wheel in order to avoid wheel skid and resultant tire wear. The differential divides the power flow to the two axles while permitting one wheel to rotate faster than the other.

When a conventional differential is used, the tractive engagements between the tires and the terrain produce reaction forces that cause orbiting gears in the differential to absorb lost motions associated with vehicle turning maneuvers.

The conventional differential is not completely effective when one of the powered vehicle wheels is operating on slippery terrain, e.g. ice, mud, soft sand, etc.; power delivered to the slippage prone wheel causes it to spin instead of delivering a reaction force back to the orbiting gears in the differential.

Limited slip differentials have been developed to avoid wheel-spin problems associated with conventional differentials. The limited slip differential includes a slippable clutch in the gear system for inducing an artificial frictional load on at least one of the axles, sufficient to prevent the undesired wheel spin. The clutch causes the two aligned axles to rotate together, with limited slippage therebetween sufficient to compensate for differences in road wheel speed associated with vehicle turning maneuvers. With a limited slip differential each powered axle receives some power, rather than having all of the power diverted into the slippage-prone wheel. The limited slip differential allows the associated vehicle to turn corners, while at the same time offering improved tire-terrain traction when the vehicle is traversing slippery terrain.

Vehicle mobility is enhanced by using the limited-slip differential in combination with run-flat tires; such tires give the vehicle a "get home" capability after a tire blow-out (failure); however, excessive axle traction can cause rapid heating of tires running flat under certain conditions. Military strategists are concerned with the effect of tire blow-outs, particularly when the vehicle is moving in enemy terrain or when subjected to enemy fire. A tire blow-out (due to a sharp object or enemy fire) can quickly immobilize the vehicle, leaving the vehicle and soldiers defenseless.

When a conventional tire on a powered wheel blows out it quickly assumes a depressurized flat condition, while the wheel continues to rotate; the depressurized tire undergoes a severe abrading action due to the speed differential between the rotating wheel and the stationary terrain surface. After a comparatively few revolutions the tire carcass assumes a twisted broken condition only partially engaged with the wheel rims; the relatively thin wheel rims and tire carcass begin to dig into the terrain, immobilizing the vehicle. The immobilized vehicle is ineffective for continued military operations.

To at least partially overcome the disadvantages of conventional tires there have been developed various run-flat tire constructions. Typically a run-flat tire includes a miniature insert structure of annular configuration. The annular insert structure is located within the tire carcass in surrounding relation to the wheel. The insert occupies the axial space between the wheel rim and tire carcass.

In some cases the annular insert structure is free to rotate relative to the wheel rim. In other cases the annular insert structure is bolted or otherwise affixed to the wheel. In either case the annular insert structure provides a relatively wide outer peripheral surface designed to engage the inner face of the tire carcass (in line with the tire tread area) to keep the wheel-tire assembly operating. The aim is to avoid the rim dig-in problem previously described.

When the military vehicle is using limited-slip differentials in combination with run-flat tires, any powered axle will continue to receive rotary power after the associated tire has been depressurized (by enemy fire or otherwise). Continued application of torque from the limited slip differential to the depressurized tire can produce early tire destruction and possible compromise of the tire insert action. Tractive forces between the terrain and the tire tread area cause the wheel flanges to spin on the tire carcass, with tire destruction consequences. The problem is caused at least partly by the fact that a limited-slip differential is used for supplying motive power to the powered axles.

The present invention seeks to at least partially overcome problems associated with the combinational usage of limited-slip differentials and run-flat tires. Applicant substitutes a driver-controlled "modified" conventional differential for the limited slip differential, while continuing to use the run flat tires. The conventional differential is modified in the sense that a manual locking means is substituted for the slip clutch used in limited-slip differentials.

The proposed differential has two operating modes. In an "unlocked" mode the differential functions like a conventional differential; the unlocked mode is used during normal operations on dry non-slippery terrain (rough terrain or smooth pavement). In a second "locked" mode the differential operates as a solid connection between the two axle sections; gearing within the differential carrier connects the axle sections so that each axle section rotates at the same rate. The second "locked" mode is used only when the vehicle is to be operated on slippery terrain, e.g. ice, snow, mud, and sand, where the unlocked differential would not supply sufficient tractive effort for forward motion.

The "unlocked" mode will be used during most of the time, especially when the vehicle is operating on tractive terrain at highway speeds, e.g., above twenty five miles per hour. The "unlocked" mode will also be used when one or more tires are punctured, e.g. after being struck by enemy fire. A flat tire has an effective diameter that is about thirty percent less than that of an inflated tire; therefore the flattened tire must rotate farther (faster) than the other tires in order to keep the vehicle running in a desired direction.

In its "unlocked" mode the differential will compensate for variations in tire rotational speed associated with a tire blow out. Most of the propeller shaft power will be directed to the inflated tire, leaving the blown tire to essentially free wheel on the terrain. This is believed to be a better run-flat action than that produced with a limited slip differential, wherein excessive power tends to be supplied to the slip-prone axle section (associated with the flat tire); the flat tire is then subject to early tire destruction.

The present invention relates to a wheeled vehicle using run-flat tires in combination with differentials that are adjustable between locked and unlocked operating modes. The invention seeks to provide the "slippery terrain" advantages of the limited slip differential and the "tire life enhancement" advantage of the conventional differential.

The differential used in this invention is in some respects similar to a differential shown in U.S. Pat. No. 4,526,063 issued to T. L. Oster on July 2, 1985. My invention relates primarily to an improved mechanism for remotely operating the differential adjustment means between the locked and unlocked modes.

I propose an operating mechanism that includes an air cylinder means and manually-operable valve for alternately supplying pressurized air to the air cylinder means or withdrawing pressurized air from the cylinder means. The cylinder means operates a clutch that effectively adjusts the differential between its locked and unlocked operating modes.

The air cylinder means can be located directly on the differential carrier in close physical proximity to the aforementioned clutch. The valve can be located in the vehicle cab or at some other point remote from the differential. When the valve is located in the vehicle cab the valve can be equipped with a handle operator for direct manual actuation by the driver. If the valve is located at some other point in the vehicle the valve can be solenoid-operated; a manual electric switch on the dashboard can then be used to operate the valve. As an alternate configuration, the air cylinder operation may be modulated by a pressure-control valve at the driver's station to apply a controlled amount of slippage from zero to 100% lock-up through conventional clutch packs between the orbiting differential gears and one drive axle. In this configuration, driver-selected variable slip control would provide optimum mobility of the run-flat tires, with the least tire wear friction.

The invention contemplates an improved mechanism for operating a vehicle differential between an unlocked mode and a locked mode.

THE DRAWINGS

Figure 2:
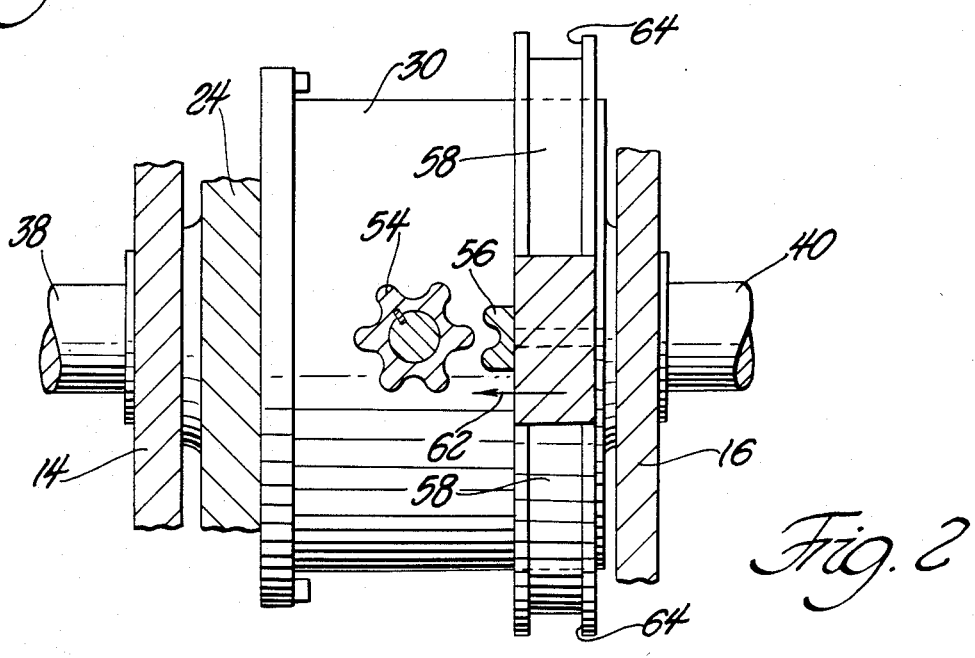
Figure 3:
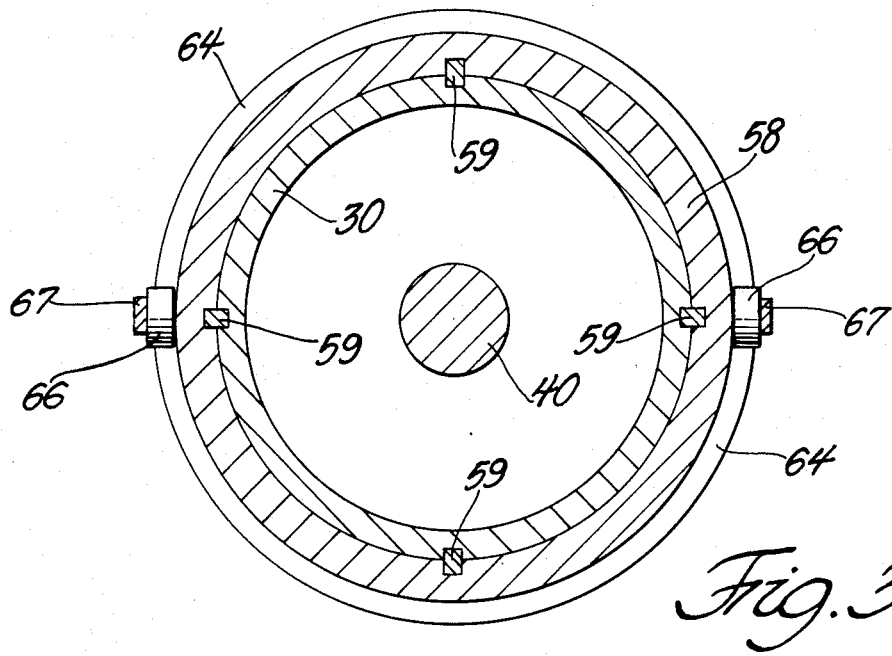
Figure 4:
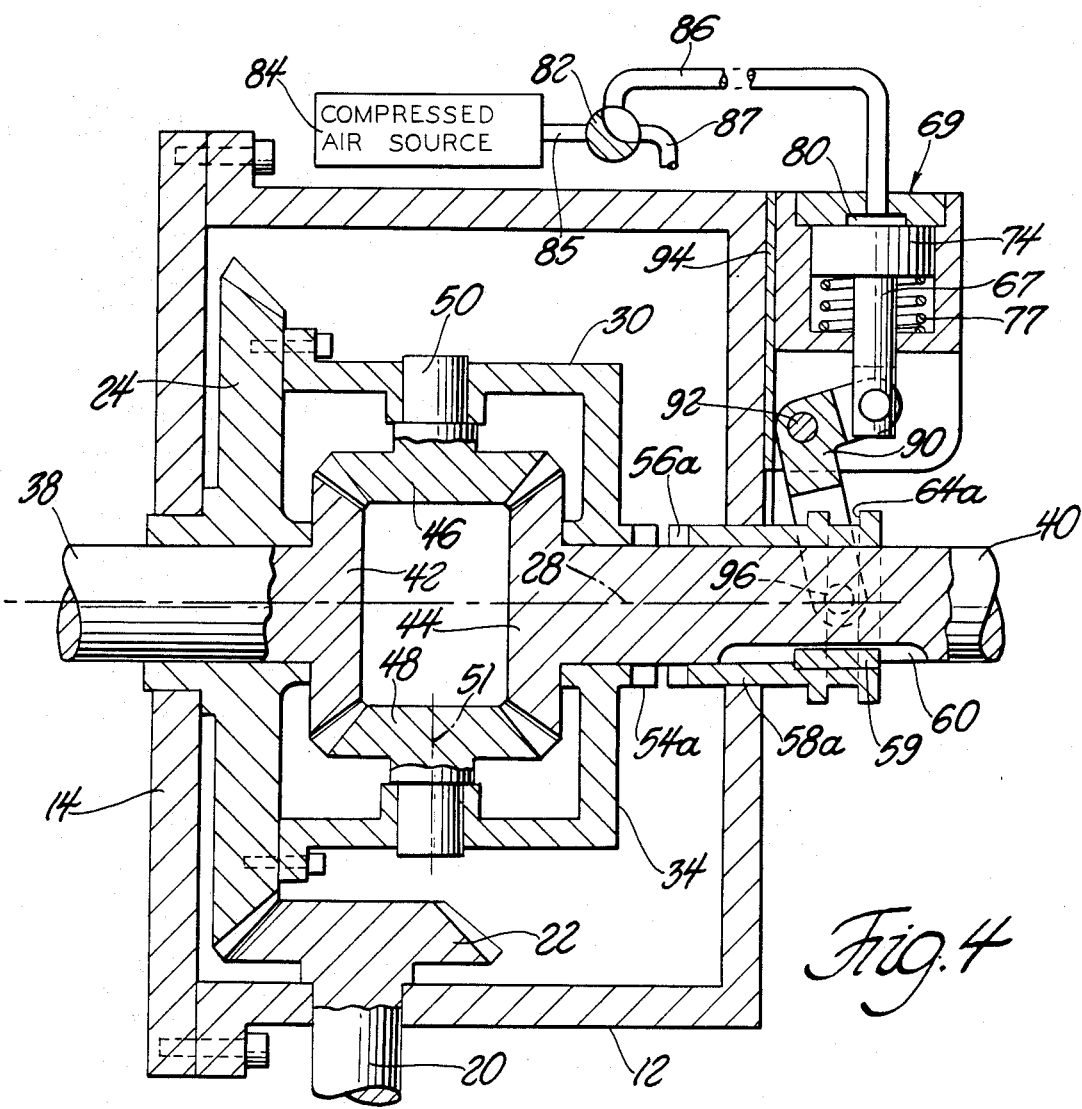

FIG. 1 is a sectional view taken through a differential embodying my invention.
FIG. 2 is a sectional view on line 2—2 in FIG. 1.
FIG. 3 is a sectional view on line 3—3 in FIG. 1.
FIG. 4 is a sectional view taken through another differential embodying my invention.
FIG. 5 is a sectional view taken through a further embodiment of my invention.

DIFFERENTIAL CONSTRUCTION

Referring in greater detail to FIG. 1, there is shown a differential 10 comprising a carrier 12 formed by a generally circular plate 14 and cup-shaped housing 16. The housing and plate may be secured together by a ring of bolts 18. The carrier is stationary relative to the vehicle on which it is used. Any number of differentials may be used in the vehicle, depending on the number of powered axles being employed. For example, some military vehicles have eight wheels, all powered. Such vehicles would use four differentials.

A propeller (drive) shaft 20 extends into carrier 12 from a non-illustrated vehicle power plant. The shaft has an input gear 22 thereon adapted to mesh with a ring gear 24. Shaft 20 rotates around axis 26, whereas gear 24 rotates around a transverse axis 28.

Attached to ring gear 24 is a differential case 30. Case 30 may be of generally cup-shaped configuration, comprised of a cylindrical side wall 32 and flat circular end wall 34. End wall 34 and gear 24 are each provided with circular hubs 36 for rotatably supporting the gear 24-case 30 assembly in carrier 12.

The two hubs 36 rotatably support a left axle (shaft) 38 and right axle (shaft) 40. Each axle 38 or 40 extends laterally to a non-illustrated road wheel having a run-flat tire thereon. U.S. Pat. Nos. 4,572,260 and 4,572,262 illustrate the general features of run-flat tires contemplated herein.

Shafts 38 and 40 have side gears 42 and 44 thereon in meshed engagement with differential gears 46 and 48. Each differential gear includes a shaft 50 thereon rotatably supported in a sleeve-type bearing 52 located on side wall 32 of differential case 30. Gears 46 and 48 are capable of rotation around axis 51 defined by shafts 50.

DIFFERENTIAL OPERATION

The differential mechanism serves as a device for transmitting motive power from shaft 20 to shafts 38 and 40. Rotation of shaft 20 around axis 26 produces rotation of ring gear 24 and associated differential case 30 around transverse axis 28. As case 30 rotates around axis 28 it causes differential gears 46 and 48 to move bodily around axis 28. Assuming shafts 38 and 40 offer the same rotational resistance, shafts 46 and 48 will be locked to case 30 and to gears 42 and 44. Both axles 38 and 40 will rotate together in unison.

Should the vehicle be steered to the left, axle 40 will be required to rotate faster than axle 38. Rotational resistance offered by the left wheel will increase, such that side gear 42 will be forced to rotate at a slower rate than side gear 44. The difference in rotation rates for side gears 42 and 44 will result in rotational movements of gears 46 and 48 around axis 51. Differential case 30 will continue rotating around axis 28.

DIFFERENTIAL LOCK-UP FEATURE

The differential thus far described operates as a conventional differential. When the vehicle is being driven on slippery terrain, e.g. ice, sand, mud, etc., the conventional differential is not entirely effective. The slippage-prone wheel tends to spin, such that differential gears 46 and 48 are caused to rotate around axis 51 without driving both gears 42 and 44. To overcome the deficiencies of the conventional differential. I have added a releasable mechanism for locking differential gears 46 and 48 against rotation around axis 51. With gears 46 and 48 locked to case 30 the two axles 38 and 40 are effectively locked together for rotation at the same rate. The two axles function as a single solid axle.

The locked operational mode is advantageous when the vehicle is operating on slippery terrain, since traction at either wheel may then be effective to move the vehicle. Reduced tractive engagements at individual wheels are additive to achieve vehicle mobility.

LOCK-UP CLUTCH MEANS

The means for releasably locking differential gears 46 and 48 to case 30 comprises a cogwheel 54 affixed to each shaft 50. Two cooperating pawls 56 are carried on a large diameter sleeve 58 that surrounds case 30. Sleeve 58 has keys 59 affixed thereto for slidable motion in key slots 60 formed in the outer peripheral surface of case 30. Sleeve 58 is thus capable of axial slidable motion in the arrow 62 direction; sleeve 58 rotates with case 30.

Sleeve 58, pawls 56, and cogwheels 54 cooperatively constitute a clutch means for releasably locking the differential gears 46 and 48 to differential case 30. FIG. 1 illustrates the clutch means in the released condition. Leftward motion of sleeve 58 in the arrow 62 direction causes pawls 56 to mesh with cogwheels 54, thereby locking the associated gears 46 and 48 to sleeve 58. The key means 59, 60 serves to lock sleeve 58 to case 30 in a rotational sense. When pawls 56 are meshed with cogwheels 54 the differential functions in a "locked" operating mode.

CLUTCH OPERATOR

Sleeve 58 is moved in the arrow 62 direction by two air cylinder assemblies 69. Each cylinder assembly comprises a cylinder housing 70 affixed to side surface 72 of carrier 12, and a piston 74 slidably disposed therein for reciprocable movement between housing end walls 76 and 78. A rod element 67 is connected to each piston 74, such that piston motion is transmitted through rod element 67 to an associated roller 66. The two rollers run in a continuous peripheral groove 64 formed in the outer peripheral surface of aforementioned sleeve 58.

Each air cylinder 69 has a compression spring 77 therein tending to move the associated piston 74 in a rightward direction (FIG. 1). The piston is moved leftwardly in response to introduction of compressed air into chamber 80. When chamber 80 is depressurized spring 77 moves piston 74 rightwardly to the FIG. 1 position. Pistons 74 move in unison to produce arrow 62 motion of sleeve 58.

AIR FLOW CONTROL

Flow of pressurized air to or from chambers 80 is controlled by a three way valve 82. Valve 82 is preferably located in the vehicle cab for manual actuation by the driver of the vehicle. Alternately, valve 82 can be located in close proximity to the on-board compressed air source 84, in which case the valve may be a motor-operated valve or solenoid-operated valve electrically connected to a manual switch on the vehicle dashboard.

Valve 82 has a first pneumatic connection 85 with the air pressure source, a second pneumatic connection 86 with air cylinder assemblies 69, and a third pneumatic connection 87 with a vent port. In its illustrated position valve 82 establishes a pneumatic path from source 84 to air cylinder units 69, whereby pistons 74 are shifted leftwardly from the FIG. 1 position. When valve 82 is rotated a quarter turn in the clockwise direction it completes a pneumatic path from air cylinder assemblies 69 to vent port 87; chambers 80 are depressurized to enable springs 77 to move pistons 74 back to the FIG. 1 positions.

My invention relates especially to the clutch operator mechanism comprehended by springs 77, air cylinder assemblies 69, and control valve 82. The pneumatic arrangement is a relatively simple low cost mechanism for giving a conventional differential a locked operational mode. Relatively, minor structural changes in conventional differential structure are all that are needed. The air cylinder units take up relatively small space on a side surface of the differential carrier. Control valve 82 can be installed at any convenient point on the vehicle, e.g. behind the vehicle dashboard or near the on-board air compressor 84.

FIG. 4 EMBODIMENT

FIG. 4 illustrates a second form that the invention can take. The differential is constructed generally similar to the differential shown in FIG. 1. However, the clutch that produces the lock-up action has a different location in the differential.

In this case the cogwheel 54 equivalent is a series of axial teeth 54a extending from differential case 30. The equivalent of pawl 56 is a series of teeth 56a extending from a sleeve 58a. Sleeve 58a has a key 59 affixed thereto for slidable movement in a key slot 60 formed in axle shaft 40. Leftward movement of sleeve 58a causes teeth 56a to mesh with teeth 54a, whereby differential case 30 is locked to shaft 40 (through sleeve 58a).

Lock-up of case 30 to axle 40 effectively prevents differential gears 46 and 48 from free rotation around axis 51. The differential then operates in the lock-up mode.

Sleeve 58a is operated by a single air cylinder 69 constructed generally similarly to the air cylinders shown in FIG. 1. In this case, piston rod 67 is connected to a bell crank 90 that is swingable on a pivot pin 92 carried in the mounting bracket 94 for the air cylinder. Bell crank 90 includes a semi-circularly curved yoke section that extends partially around sleeve 58a. Pins or rollers 96 extend from the yoke section into an endless peripheral groove 64a in sleeve 58a.

Introduction of pressurized air into chamber 80 enables piston 74 to shift bell crank 90 clockwise around pin 92 so as to move sleeve 58a in a leftward direction. Adjustment of valve 82 to its illustrated "vent" position depressurizes the air cylinder, enabling spring 77 to return the mechanisms to their FIG. 4 positions.

FIG. 5 EMBODIMENT

FIG. 5 illustrates a third form that the invention can take. In this case a lock-up means is provided between differential case 30a and axle 40. The lock-up means takes the form of a manually-adjustable disc clutch 88.

Clutch 88 comprises a first series of clutch plates 89 keyed to differential case 30a, and a second series of clutch plates 91 keyed to axle 40. The plates are alternated so that each plate connected to case 30a has frictional engagement with at least one other plate connected to axle 40. Clutch 88 is designed so that the driving torque from differential case 30a to axle 40 can be varied by controlling the frictional drag between plates 89 and 91. Drive torque is increased by applying an axial force on the rightmost plate 89; driving torque is decreased by reducing the axial force on rightmost plate 89.

The operating means for clutch 88 comprises two air cylinders 69a affixed to carrier 12. Each air cylinder has a piston 74 arranged for movement under the influence of spring 77 and pressurized air in chamber 80. Each piston rod 67 carries a roller 81 designed to roll on the adjacent clutch plate 89.

When the pressure in chambers 80 is relatively high the clutch plates 89 and 91 are forced into tight frictional engagement with one another; the differential then operates in the "locked-up" mode so that axle sections 38 and 40 function as a single solid axle. When chambers 80 are depressurized springs 77 move pistons 74 to the right, thereby substantially removing the frictional drag forces between clutch plates 89 and 91. The differential then operates in the conventional "unlocked" mode.

By adjusting the pressure in chambers 80 at different intermediate values (somewhere between zero gage pressure and the maximum source 84 pressure) it is possible to achieve a "controlled slip" type operation.

Any conventional pressure regulator can be used to adjust the chamber 80 pressure. FIG. 5 shows a conventional pressure regulator that includes a metering element 61 connected to a pressure-responsive diaphragm 63. A spring 68 applies a controlled force on diaphragm 63 in opposition to the pressure in zone 65. A screw 71 is employed to vary the spring 68 force and the associated pressure in zone 65.

Manually-operable handle 73 is used to vary the adjusted position of screw 71 and the controlled pressure in zone 65 (and chambers 80). Handle 73 can be equipped with a pointer 75 readable against gradations on a dial plate 79. The mechanism is designed to enable the driver of the vehicle to vary (adjust) the operating pressure in chambers 80, for thereby controlling (adjusting) the slip existing between differential case 30a and axle section 40.

Manual slip control provides a greater degree of lock-up than can be achieved with other known limited slip differentials (having a single non-varying degree of slip). With the described variable slip differential the driver can select the slip necessary to meet specific conditions. The vehicle can be maneuvered through some types of slippery terrain not possible with prior art limited slip differentials. Adjustable slip control can also be used to compensate for clutch plate wear, thus extending the differential service life.

DIFFERENTIAL ACTION WITH RUN-FLAT TIRE DEFLATED

As previously noted, the adjustable differential (FIG. 1, FIG. 4 or FIG. 5) is used in combination with run-flat tires. In the event of tire puncture (by enemy action or otherwise) the differential will be maintained in the "unlocked" mode. The punctured tire has an effective diameter that is about thirty percent less than that of the inflated tire (on the other axle). With the differential in the unlocked mode the driving torque will go primarily to the inflated tire; the punctured tire will essentially free wheel on the terrain, such that the thirty percent difference in diameters has minimal effect on tire integrity.

If the differential were to be in the "locked" mode after a tire puncture the tire integrity and clutch performance could be seriously compromised. With a thirty percent difference in tire diameter (inflated tire versus punctured tire), delivery of driving torque to both axles would produce a severe abraiding action at the punctured tire. The driving force would tend to rotate the smaller diameter (punctured) tire at a slower rate than the rotational speed otherwise resulting from vehicle motion (due to tractive effect of the inflated tire). The punctured tire would tend to degrade rapidly. Also, the limited slip clutch (in the differential) would be heavily loaded, with a tendency toward early failure. In some cases, the vehicle would tend to turn or steer in the direction of the punctured tire, with possible loss of steering control.

The invention seeks to provide a vehicle propulsion system wherein run-flat tires are used in combination with an adjustable differential (locked or unlocked modes), thereby achieving good vehicle mobility under a range of different conditions (slippery terrain or punctured tire).

I wish it to be understood that I do not desire to be limited to the exact details of construction shown and described for obvious modifications will occur to a person skilled in the art, without departing from the spirit and scope of the appended claims.

I claim:

1. In a wheeled vehicle having a drive shaft, left and right wheel-tire assemblies, left and right axles connected to respective ones of the wheel-tire assemblies for delivering motive power thereto, and differential arranged to transmit power from the drive shaft to the axles; said differential comprising a carrier, an input gear carried by the drive shaft for rotation within the carrier, output side gears carried by individual axles for independent rotation within the carrier, a ring gear driven by the input gear for rotation within the carrier, a differential case secured to the ring gear for rotation therewith, and differential gears rotatably mounted on the differential case in meshed engagement with the output gears, whereby power is delivered to the output side gears from the case through the differential gears:

the improvement comprising releasable means for adjustably locking one of the side gears to the differential case or unlocking said one side gear for free rotation relative to the differential case; said releasable locking means comprising a first series of clutch plates keyed to the differential case, and a second series of clutch plates keyed to the axle associated with said one side gear; the first and second clutch plates being interspersed so that adjacent plates can be frictionally engaged to form a driving connection from the differential case to said one side gear; a plural number of air cylinder units mounted on the carrier; each air cylinder unit comprising a piston, a piston rod, and a roller on the piston rod; said air cylinder units being arranged so that the rollers have pressure contact with an end one of the clutch plates to transmit an operating force thereto; an air pressure source; manually-operable valve means enabling pressurized air to flow from the source to the air cylinder units, or to flow from the air cylinder units to atmosphere; and a manually adjustable air pressure regulating means for varying the pressure of the air flowing from the source to the valve means, whereby the frictional forces existing between the clutch plates are varied to vary the amount of slippage between the plates when the air cylinder units are pressurized.

* * * * *